United States Patent
Lee et al.

(10) Patent No.: US 11,552,289 B2
(45) Date of Patent: Jan. 10, 2023

(54) COMPOSITE NEGATIVE ELECTRODE MATERIAL FOR SECONDARY BATTERY, AND NEGATIVE ELECTRODE AND LITHIUM SECONDARY BATTERY INCLUDING THE SAME

(71) Applicant: LG Chem, Ltd., Seoul (KR)

(72) Inventors: Su Min Lee, Daejeon (KR); Sun Young Shin, Daejeon (KR); Eun Kyung Kim, Daejeon (KR); Su Yeon Lee, Daejeon (KR); Lilin Piao, Daejeon (KR)

(73) Assignee: LG Energy Solution, Ltd.

( * ) Notice: Subject to any disclaimer, the term of this patent is extended or adjusted under 35 U.S.C. 154(b) by 586 days.

(21) Appl. No.: 15/746,322

(22) PCT Filed: May 19, 2017

(86) PCT No.: PCT/KR2017/005226
§ 371 (c)(1),
(2) Date: Jan. 19, 2018

(87) PCT Pub. No.: WO2017/200338
PCT Pub. Date: Nov. 23, 2017

(65) Prior Publication Data
US 2018/0212238 A1    Jul. 26, 2018

(30) Foreign Application Priority Data

May 19, 2016  (KR) .................. 10-2016-0061365
May 18, 2017  (KR) .................. 10-2017-0061875

(51) Int. Cl.
*H01M 4/36*    (2006.01)
*H01M 4/133*   (2010.01)
(Continued)

(52) U.S. Cl.
CPC .......... *H01M 4/366* (2013.01); *H01M 4/133* (2013.01); *H01M 4/1393* (2013.01);
(Continued)

(58) Field of Classification Search
CPC ...... H01M 4/366; H01M 4/621; H01M 4/628; H01M 4/625; H01M 4/1393; H01M 4/133;
(Continued)

(56) References Cited

U.S. PATENT DOCUMENTS

2002/0034686 A1 *   3/2002   Yamakawa ........... H01M 4/621
                                                        429/217
2013/0089784 A1     4/2013   Cho et al.
2017/0170465 A1     6/2017   Kim et al.

FOREIGN PATENT DOCUMENTS

CN    102795873 A      11/2012
JP    H08195197    *   7/1996    .............. H01M 4/02
(Continued)

OTHER PUBLICATIONS

English translation of JP2013-134938.*
(Continued)

*Primary Examiner* — Kiran Quraishi Akhtar
(74) *Attorney, Agent, or Firm* — Lerner, David, Littenberg, Krumholz & Mentlik, LLP

(57) ABSTRACT

The present invention relates to a composite negative electrode material for a secondary battery, and a negative electrode and a lithium secondary battery which include the same, and particularly to a composite negative electrode material for a secondary battery, which includes a graphene sheet, and two or more coating layers formed on both sides of the graphene sheet, wherein the two or more coating layers include at least one polymer coating layer and at least one pitch coating layer, and the graphene sheet and the two (Continued)

or more coating layers are included in a weight ratio of greater than 1:greater than 0.01 to less than 0.1, and a negative electrode and a lithium secondary battery which include the same.

10 Claims, 1 Drawing Sheet

(51) Int. Cl.
    *H01M 4/587*     (2010.01)
    *H01M 4/62*     (2006.01)
    *H01M 10/0525*     (2010.01)
    *H01M 4/1393*     (2010.01)
    *H01M 4/02*     (2006.01)

(52) U.S. Cl.
    CPC ............ *H01M 4/587* (2013.01); *H01M 4/621* (2013.01); *H01M 4/628* (2013.01); *H01M 10/0525* (2013.01); *H01M 4/625* (2013.01); *H01M 2004/027* (2013.01); *H01M 2220/20* (2013.01); *Y02E 60/10* (2013.01)

(58) Field of Classification Search
    CPC ............. H01M 4/587; H01M 10/0525; H01M 2004/027; H01M 2220/20; H01M 4/622; H01M 4/36; H01M 10/0569; H01M 4/62; Y02E 60/122; Y02E 60/10
See application file for complete search history.

(56) References Cited

FOREIGN PATENT DOCUMENTS

| | | | | |
|---|---|---|---|---|
| JP | H08195197 A | | 7/1996 | |
| JP | 2011-154981 | * | 8/2011 | ............ Y02E 60/10 |
| JP | 2013084601 A | | 5/2013 | |
| JP | 2013-134938 | * | 7/2013 | ........ H01M 10/0569 |
| JP | 2013134938 A | | 7/2013 | |
| JP | 2014196206 A | | 10/2014 | |
| KR | 20130090437 A | | 8/2013 | |
| KR | 20140120751 A | | 10/2014 | |
| KR | 20140140982 | * | 12/2014 | ............ H01M 4/583 |
| KR | 20140140982 A | | 12/2014 | |
| KR | 20150088752 A | | 8/2015 | |
| KR | 20160024564 A | | 3/2016 | |

OTHER PUBLICATIONS

English translation of KR20140140982.*
English translation of JP H08195197.*
English Translation of JP2011-154981.*
Extended European Search Report including Written Opinion for EP17799695.6 dated Mar. 29, 2018.
Search report from International Application No. PCT/KR2017/005226, dated Aug. 28, 2017.
Chinese Search Report for Application No. CN 201780002605.6 dated Apr. 2, 2020, 1 page.

* cited by examiner

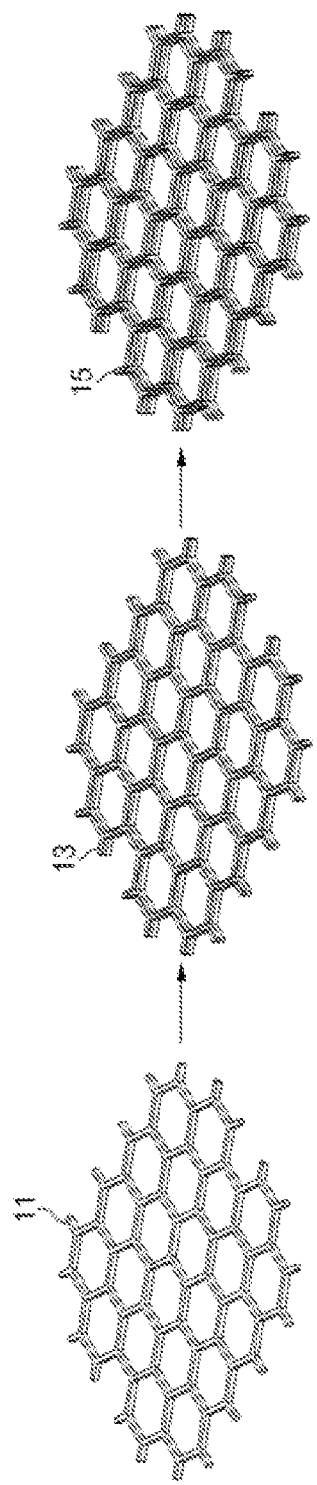

COMPOSITE NEGATIVE ELECTRODE MATERIAL FOR SECONDARY BATTERY, AND NEGATIVE ELECTRODE AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2017/005226 filed May 19, 2017, which claims priority to Korean Patent Application No. 10-2016-0061365, filed on May 19, 2016, and Korean Patent Application No. 10-2017-0061875, filed on May 18, 2017, the disclosures of which are incorporated herein by reference.

TECHNICAL FIELD

The present invention relates to a composite negative electrode material for a secondary battery, and a negative electrode and a lithium secondary battery which include the same.

BACKGROUND ART

Among secondary batteries currently used, since a lithium ion secondary battery has excellent energy efficiency due to the fact that chemical and physical properties are not deteriorated depending on external and internal influences in comparison to other batteries while it has a small size and is lightweight and has cycle stability (long cycle life), the lithium ion secondary battery has been used as a main energy storage device such as a portable electronic device.

In particular, efforts to develop electrode materials for a secondary battery having improved electrochemical performance are concentrated as the lithium secondary battery has recently received attention as a power storage device of power supply sources of hybrid vehicles and electric vehicles.

Currently, among the electrode materials of the lithium secondary battery, carbon-based materials are being used as a negative electrode material, and, among them, a significant amount of research on graphene having unusual properties has been conducted.

Since graphene, as an aggregate of numerous benzene rings, has a structure favorable for accessing lithium ions in comparison to typical graphite, it is known that the graphene has very high electrical mobility (electrical conductivity).

However, there are many limitations in applying the graphene to real industry.

One of the reasons for this is that it is difficult to secure a sufficient amount of the graphene depending on manufacturing methods or it is difficult to achieve unique characteristics of the graphene. For example, graphene prepared by a chemical vapor deposition method has higher purity than other graphenes and graphene having a desired size may particularly be prepared, but an amount of the graphene prepared may be small. Also, since the above method uses a method of growing the graphene on a metal surface, the method is disadvantageous in that an additional treatment is required to use the graphene. With respect to graphene prepared by using a physical method, it also is disadvantageous in that it is difficult to secure a sufficient amount of the graphene, similar to the limitations of the chemical vapor deposition method. A method, in which graphene is prepared by reduction of graphene oxide that is prepared by an acid treatment of graphite, may obtain a larger amount of the graphene than other methods, but the method is disadvantageous in that it is difficult to achieve characteristics of pure graphene.

Another reason for this is that, with respect to graphene, since a significant side reaction with an electrolyte solution occurs due to its large specific surface area, initial efficiency may be low and storage characteristics at high temperature may be degraded, and thus, it is disadvantageous in that it is difficult to apply the graphene to an actual battery.

DISCLOSURE OF THE INVENTION

Technical Problem

An aspect of the present invention provides a graphene-based composite negative electrode material for a secondary battery having high initial efficiency and improved storage characteristics at high temperature.

Another aspect of the present invention provides a method of preparing a composite negative electrode material for a secondary battery.

Another aspect of the present invention provides a negative electrode including the composite negative electrode material for a secondary battery.

Another aspect of the present invention provides a lithium secondary battery including the negative electrode of the present invention.

Technical Solution

According to an aspect of the present invention, there is provided a composite negative electrode material for a secondary battery including:

a graphene sheet; and two or more coating layers formed on both sides of the graphene sheet, wherein the two or more coating layers include at least one polymer coating layer and at least one pitch coating layer, and the graphene sheet and the two or more coating layers are included in a weight ratio of 1:greater than 0.01 to less than 0.1.

Also, the composite negative electrode material for a secondary battery of the present invention may include:

a graphene sheet;

a first coating layer formed on both sides of the graphene sheet; and a second coating layer formed on a surface of the first coating layer.

In this case, the first coating layer may include a polymer coating layer, and the second coating layer may include a pitch coating layer. Also, the first coating layer may include a pitch coating layer, and the second coating layer may include a polymer coating layer.

According to another aspect of the present invention, there is provided a method of preparing the composite negative electrode material for a secondary battery of the present invention including:

forming a first coating layer on both sides of a graphene sheet; and forming a second coating layer on a surface of the first coating layer of the graphene sheet having the first coating layer formed thereon.

According to another aspect of the present invention, there is provided a negative electrode for a secondary battery including:

a negative electrode collector; and a negative electrode material mixture coated on the negative electrode collector, wherein the negative electrode material mixture includes the composite negative electrode material for a secondary battery of the present invention.

According to another aspect of the present invention, there is provided a lithium secondary battery including:

a positive electrode, a negative electrode, a separator disposed between the positive electrode and the negative electrode, and an electrolyte solution, wherein the negative electrode includes the negative electrode of the present invention.

Advantageous Effects

According to an embodiment of the present invention, a safe solid electrolyte interface (SEI) may be formed on a surface of a negative electrode by introducing two or more composite coating layers including a polymer coating layer and a pitch coating layer on both sides of a graphene sheet, in comparison to graphene into which a coating layer is not introduced. In conclusion, since a side reaction with an electrolyte solution is reduced, a negative electrode having improved overall performance, such as initial efficiency and high-temperature life characteristics, and a lithium secondary battery including the same may be prepared.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 is a schematic view illustrating a process of preparing a composite negative electrode material for a secondary battery according to the present invention.

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Recently, in the preparation of a lithium secondary battery, a graphene material, which has excellent electrical conductivity, flexibility, and large surface area in comparison to a typical carbon material, is evaluated as a negative electrode material for a next-generation secondary battery. However, with respect to the graphene, a side reaction with an electrolyte solution may easily occur due to large irreversibility, the graphene may have low initial efficiency. Also, when an electrode is prepared by using a graphene sheet, since graphene is easily agglomerated during a slurry mixing or pressing process, there is a concern that high-temperature storage characteristics as well as electrolyte impregnability and ionic conductivity may be reduced.

Thus, the present invention aims at providing a negative electrode material for a secondary battery having improved initial efficiency, ionic conductivity, and high-temperature life characteristics and a secondary battery including the same by improving the disadvantages of the graphene.

Specifically, in an embodiment of the present invention, provided is a composite negative electrode material for a secondary battery including:

a graphene sheet; and two or more coating layers formed on both sides of the graphene sheet, wherein the two or more coating layers include at least one polymer coating layer and at least one pitch coating layer, and the graphene sheet and the two or more coating layers are included in a weight ratio of 1:greater than 0.01 to less than 0.1.

First, the graphene has a two-dimensional planar structure in the form of a sheet in which carbon atoms are arranged in the form of a hexagonal mesh, and is characterized by having electrical conductivity and thermal conductivity in a two-dimensional direction in a plane. Graphene is in the spotlight as a material having chemical stability as well as better electrical conductivity than graphite, which has mainly been used as a conventional negative electrode active material, and a large surface area of 2,600 $m^2/g$ or more.

Since the negative electrode material of the present invention includes the graphene having excellent conductivity as a base material of the composite negative electrode material, it is considered that the negative electrode material of the present invention may exhibit excellent conductivity.

Specifically, in the composite negative electrode material of the present invention, it is desirable to use a reduced graphene oxide nanosheet as the graphene sheet. The graphene sheet may have a thickness of about 0.1 μm to about 1 μm, for example, 0.3 μm to 0.8 μm. In a case in which the thickness of the graphene sheet is less than 0.1 μm, the price of the graphene sheet is high and the preparation of the electrode is difficult, and, in a case in which the thickness of the graphene sheet is greater than 1 μm, resistance may increase.

In the composite negative electrode material for a secondary battery of the present invention, the graphene sheet and the two or more coating layers may be included in a weight ratio of 1:greater than 0.01 to less than 0.1, particularly 1:0.02 to less than 0.1, and more particularly 1:0.02 to 0.08, for example, 1:0.02 to 0.05.

In a case in which an amount of the two or more coating layers is 0.01 or less, an effect of reducing the side reaction with the electrolyte solution may be insignificant, and, in a case in which the amount of the two or more coating layers is 0.1 or more, costs may increase and the resistance may increase.

Also, in the composite negative electrode material of the present invention, the polymer coating layer maintains a stable surface state by including a polyacrylic acid ester-based copolymer, and thus, high-temperature stability of the battery may be improved. The polyacrylic acid ester-based copolymer may specifically include a copolymer of (A) a (meth)acrylic acid ester-based monomer; and (B) a single material selected from the group consisting of an unsaturated carboxylic acid-based monomer, a vinyl-based monomer, and a nitrile-based monomer, or two or more monomers thereof.

In this case, typical examples of the (meth)acrylic acid ester-based monomer (A) may be a single material selected from the group consisting of methyl acrylate, ethyl acrylate, propyl acrylate, isopropyl acrylate, n-butyl acrylate, isobutyl acrylate, n-amyl acrylate, isoamyl acrylate, 2-ethylhexyl methacrylate, 2-ethylhexyl acrylate, 2-hydroxyethyl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, 2-hydroxyethyl methacrylate, and hydroxypropyl methacrylate, or a mixture of two or more thereof.

Also, typical examples of the unsaturated carboxylic acid-based monomer included in the monomer (B) may include a single material selected from the group consisting of maleic acid, fumaric acid, methacrylic acid, acrylic acid, glutaconic acid, itaconic acid, tetrahydrophthalic acid, crotonic acid, isocrotonic acid, and nadic acid, or a mixture of two or more thereof.

Typical examples of the vinyl-based monomer included in the monomer (B) may include a single material selected from the group consisting of styrene, α-methylstyrene, β-methylstyrene, p-t-butylstyrene, and divinylbenzene, or a mixture of two or more thereof.

Typical examples of the nitrile-based monomer included in the monomer (B) may include a single material selected from the group consisting of succinonitrile, sebaconitrile, fluoronitrile, chloronitrile, acrylonitrile, and methacrylonitrile, or a mixture of two or more thereof.

Specifically, the polymer coating layer may include a copolymer of methyl acrylate and styrene, a copolymer of methyl acrylate, maleic acid, α-methylstyrene, and acrylonitrile, and a copolymer of 2-hydroxyethyl acrylate, p-t-butylstyrene, and acrylonitrile.

Furthermore, the pitch may include a coal-based pitch.

Specifically, the composite negative electrode material for a secondary battery of the present invention may include:

a graphene sheet;

a first coating layer formed on both sides of the graphene sheet; and a second coating layer formed on a surface of the first coating layer.

In this case, in the composite negative electrode material for a secondary battery of the present invention, it is desirable that the first coating layer and the second coating layer are different from each other. For example, in a case in which the first coating layer includes a polymer coating layer, the second coating layer may include a pitch coating layer. Also, in a case in which the first coating layer includes a pitch coating layer, the second coating layer may include a polymer coating layer.

In the composite negative electrode material for a secondary battery of the present invention, in a case in which the first or second coating layer is a polymer coating layer, the first or second coating layer may also be selectively formed only on one side of the graphene sheet.

Also, in the composite negative electrode material for a secondary battery of the present invention, the graphene sheet, the first coating layer, and the second coating layer may be included in a weight ratio of 1:0.005 to less than 0.05:0.005 to less than 0.05, particularly 1:0.005 to 0.03: 0.005 to 0.03, and more particularly 1:0.005 to 0.01:0.005 to 0.01.

In a case in which amounts of the first and second coating layers are respectively less than 0.005, the effect of reducing the side reaction with the electrolyte solution may be insignificant, and, in a case in which the amounts of the first and second coating layers are respectively 0.05 or more, the costs may increase and the resistance may increase.

The composite negative electrode material for a secondary battery of the present invention may selectively further include at least one additive of a conductive agent and a binder. In this case, the conductive agent may not be included due to excellent electrical conductivity of the pitch-coated graphene.

The conductive agent is commonly added in an amount of 1 wt % to 30 wt % based on a total weight of the negative electrode material.

Any conductive agent may be used without particular limitation so long as it has suitable conductivity without causing adverse chemical changes in the battery, and, for example, a conductive material such as: graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used. Specific examples of a commercial conductive agent may be acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The binder is a component that assists in the binding between the active material and the conductive agent and in the binding with the current collector, wherein the binder may typically be added in an amount of 1 wt % to 30 wt % based on the total weight of the negative electrode material. In a case in which the amount of the binder is greater than 30 wt %, there is a concern that life characteristics may be degraded due to an increase in the resistance of the electrode and energy density of the battery may be reduced due to a decrease in an active material ratio. Also, in a case in which the amount of the binder is less than 1 wt %, there is a concern that an electrode active material slurry may not be mixed or electrode adhesion may be reduced.

Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

The composite negative electrode material for a secondary battery of the present invention may have an average particle diameter of about 20 μm and a specific surface area of about 20 m$^2$/g.

Furthermore, in an embodiment of the present invention, provided is a method of preparing a composite negative electrode material for a secondary battery including:

forming a first coating layer on both sides of a graphene sheet; and forming a second coating layer on a surface of the first coating layer of the graphene sheet having the first coating layer formed thereon.

In this case, it is desirable that the first coating layer and the second coating layer have different configurations from each other. For example, in a case in which the first coating layer includes a polymer, the second coating layer may include a pitch. Also, in a case in which the first coating layer includes a pitch, the second coating layer may include a polymer.

Also, in the method of the present invention, the graphene sheet, the first coating layer, and the second coating layer may be included in a weight ratio of 1:0.005 to less than 0.05:0.005 to less than 0.05, particularly 1:0.005 to 0.03: 0.005 to 0.03, and more particularly 1:0.005 to 0.01:0.005 to 0.01.

In a case in which an amount of each of the first and second coating layers is increased, since the thickness is increased, the resistance may increase.

In the method of preparing a composite negative electrode material for a secondary battery of the present invention, in a case in which the first or second coating layer is a polymer coating layer, the first or second coating layer may also be selectively formed only on one side of the graphene sheet.

Hereinafter, each step of a process of preparing the negative electrode material of the present invention will be described in detail with reference to FIG. 1. In this case, FIG. 1 only illustrates one side of the graphene sheet, and includes that a double coating layer having the same structure is also formed on the other side of the graphene sheet.

In the method of the present invention, a first coating composition is coated on or mixed with a graphene sheet 11 and a heat treatment is then performed to form a first coating layer 13.

In this case, the first coating composition may include at least one of a polymer and a pitch.

In a case in which the first coating composition includes the polymer, the first coating layer may be formed by coating with the first coating composition. For example, the polymer is dissolved in a solvent, and the graphene sheet may then be surface-treated by impregnation, spraying, or a conventional coating method, heated, and dried to form the first coating layer. Also, crystalline carbon is added to the polymer-containing solution, and a polymerization reaction is then performed on the surface of the crystalline carbon to form the first coating layer.

As described above, the polymer may include a polyacrylic acid ester-based copolymer including a copolymer of (A) a (meth)acrylic acid ester-based monomer; and (B) a single material selected from the group consisting of an unsaturated carboxylic acid-based monomer, a vinyl-based monomer, and a nitrile-based monomer, or two or more monomers thereof.

Also, the solvent may include one selected from the group consisting of acetone, tetrahydrofuran, methylene chloride, chloroform, dimethylformamide, N-methyl-2-pyrrolidone (NMP), and cyclohexane, or a mixture of two or more thereof.

Furthermore, in a case in which the first coating composition includes the pitch, the graphene sheet and the pitch are mixed, and the mixture may then be sintered and carbonized to form the first coating layer.

The pitch may include a coal-based pitch.

The sintering and carbonizing may be performed by heat treating in a temperature range of 250° C., near a softening point of the pitch, to 1,400° C. for 2 hours to 5 hours in an air atmosphere.

Next, in the method of the present invention, a second coating composition is coated on the surface of the graphene sheet 11 having the first coating layer 13 formed thereon or mixed with the graphene sheet 11 having the first coating layer 13 formed thereon, and a heat treatment is then performed to form a second coating layer 15.

The second coating composition may include at least one of a polymer and a pitch, but the second coating composition may be formed of a material different from the first coating composition.

In a case in which the second coating composition includes the polymer, the polymer is dissolved in a solvent, and the graphene sheet may then be surface-treated by impregnation, spraying, or a conventional coating method. Also, crystalline carbon is added to the polymer-containing solution, and a polymerization reaction may then be performed on the surface of the crystalline carbon to form the second coating layer.

In a case in which the second coating composition includes the pitch, the graphene sheet including the first coating layer and the pitch are mixed, and the mixture may then be sintered and carbonized to form the second coating layer.

The sintering and carbonizing may be performed by heat treating in a temperature range of 250° C., near a softening point of the pitch, to 1,400° C. for 2 hours to 5 hours in an air atmosphere.

Also, when the first and second coating layers are formed on the graphene sheet, a coating material, which does not cause the side reaction with the electrolyte solution and is generally used during coating of the surface of the active material, and an amorphous carbon material, such as heavy oil, may be further included.

As described above, in the present invention, since the double coating layer using the polymer coating layer and the pitch coating layer is coated on the graphene sheet, an effect of improving the initial efficiency of the battery may be achieved by preventing the side reaction with the electrolyte solution. That is, with respect to a graphene nanosheet, since its specific surface area is a few hundred $m^2/g$ or more, many edges are exposed to the electrolyte solution during the preparation of a lithium ion battery, and thus, it is disadvantageous in that the graphene nanosheet has low initial efficiency (high irreversible capacity) through a reaction between the graphene and the electrolyte solution. Also, the graphene layer may be continuously exfoliated as charge and discharge cycles proceed. If the graphene layer is appropriately protected by coating with the pitch layer, as an amorphous carbon layer, and the polymer coating layer, the reactivity with the electrolyte solution is reduced so that effects of increasing initial efficiency and having stable life characteristics may be expected.

Furthermore, with respect to conventional spheroidized natural graphite, since graphene layers are densely stacked, performance degrades at a high C-rate. In contrast, with respect to the graphene nanosheet, since a spacing between the graphene layers is wide, rapid intercalation and deintercalation of lithium ions are possible. However, as described above, since the graphene nanosheets may be easily agglomerated in the pressing process during the preparation of the electrode, a relatively hard pitch component and a polymer component are disposed between the graphene layers in the present invention, and thus, reagglomeration of the graphene layers during the pressing process may be prevented. Accordingly, since the spacing between the graphene layers may be widely maintained, high-temperature durability may be improved.

Also, in an embodiment of the present invention, provided is a negative electrode for a secondary battery including:

a negative electrode collector; and a negative electrode material mixture coated on the negative electrode collector, wherein the negative electrode material mixture includes the composite negative electrode material for a secondary battery of the present invention.

In the negative electrode for a secondary battery of the present invention, the collector is not particularly limited so long as it has conductivity without causing adverse chemical changes in the battery, and, for example, copper, stainless steel, aluminum, nickel, titanium, fired carbon, copper or stainless steel that is surface-treated with one of carbon, nickel, titanium, or silver, or an aluminum-cadmium alloy may be used. Also, similar to a positive electrode collector, the negative electrode collector may be used in various shapes, for example, a film, a sheet, a foil, a net, a porous body, a foam body, or a non-woven fabric body, in which fine irregularities are formed on the surface thereof.

Furthermore, as described above, the composite negative electrode material for a secondary battery of the present invention may further selectively include at least one additive of a conductive agent and a binder.

Also, in an embodiment of the present invention, provided is a lithium secondary battery including:

a positive electrode, a negative electrode, a separator disposed between the positive electrode and the negative electrode, and an electrolyte solution, wherein the negative electrode includes the negative electrode of the present invention.

In this case, those typically used in the preparation of the lithium secondary battery may all be used as the positive electrode, the negative electrode, and the separator.

In this case, the positive electrode may be prepared by coating a positive electrode material mixture including a positive electrode active material, a binder, a conductive agent, and a solvent on a positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

Also, the positive electrode active material may include at least one positive electrode active material selected from the group consisting of $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2O_2$ (where M1 and M2 are each independently selected from the group consisting of aluminum (Al), nickel (Ni), cobalt (Co), iron (Fe), manganese (Mn), vanadium (V), chromium (Cr), titanium (Ti), tungsten (W), tantalum (Ta), magnesium (Mg), and molybdenum (Mo), and x, y, and z are atomic fractions of each independent oxide composition elements, wherein $0 \leq x < 0.5$, $0 \leq y < 0.5$, $0 \leq z < 0.5$, and $x+y+z \leq 1$), but the positive electrode active material is not limited thereto.

The conductive agent is commonly added in an amount of 1 wt % to 30 wt % based on a total weight of the mixture including the positive electrode active material.

Any conductive agent may be used without particular limitation so long as it has suitable conductivity without causing adverse chemical changes in the battery, and, for example, a conductive material such as: graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used. Specific examples of a commercial conductive agent may be acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The binder is a component that assists in the binding between the active material and the conductive agent and in the binding with the current collector, wherein the binder is typically added in an amount of 1 wt % to 30 wt % based on the total weight of the mixture including the positive electrode active material. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

Also, the electrolyte solution may include a lithium salt and a non-aqueous organic solvent.

In this case, the lithium salt may be used without limitation so long as it is typically used in an electrolyte solution for a lithium secondary battery, and, for example, may include $Li^+$, as a cation of the lithium salt, and any one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO_2^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion.

Furthermore, the non-aqueous organic solvent included in the above-described electrolyte solution of the present invention may be used without limitation so long as it is typically used in an electrolyte solution for a lithium secondary battery, and, for example, ether, ester, amide, linear carbonate, or cyclic carbonate may be used alone or in a mixture of two or more thereof.

Among these compounds, the cyclic carbonate, the linear carbonate, or a carbonate compound, as a mixture thereof, may be typically included. Specific examples of the cyclic carbonate compound may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and halides thereof, or a mixture of two or more thereof. Also, specific examples of the linear carbonate compound may be any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof, but the present invention is not limited thereto.

In particular, since cyclic carbonates, such as ethylene carbonate and propylene carbonate, among the carbonate-based organic solvents well dissociate the lithium salt in the electrolyte due to high dielectric constants as highly viscous organic solvents, the ethylene carbonate and propylene carbonate may be preferably used. Since an electrolyte solution having high electrical conductivity may be prepared when the above cyclic carbonate is mixed with low viscosity, low dielectric constant linear carbonate, such as dimethyl carbonate and diethyl carbonate, in an appropriate ratio, the ethylene carbonate and propylene carbonate may be more preferably used.

Also, as the ether among the organic solvents, any one selected from the group consisting of dimethyl ether, diethyl ether, dipropyl ether, methyl ethyl ether, methyl propyl ether, and ethyl propyl ether, or a mixture of two or more thereof may be used, but the present invention is not limited thereto.

As the ester among the organic solvents, any one selected from the group consisting of liner esters such as methyl acetate, ethyl acetate, propyl acetate, methyl propionate, ethyl propionate, propyl propionate, and butyl propionate; and cyclic esters such as γ-butyrolactone, γ-valerolactone, γ-caprolactone, σ-valerolactone, and ε-caprolactone, or a mixture of two or more thereof may be used, but the present invention is not limited thereto.

Furthermore, the non-aqueous electrolyte solution of the present invention may further include an additive for forming a solid electrolyte interface (SEI) known in the art within the scope of the present invention. As the additive for forming an SEI which may be used in the present invention, vinylene carbonate, vinyl ethylene carbonate, fluoroethylene carbonate, cyclic sulfite, saturated sultone, unsaturated sultone, and non-cyclic sulfone may be used alone or in a mixture of two or more thereof.

In this case, the cyclic sulfite may include ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, or 1,3-butylene glycol sulfite, the saturated sultone may include 1,3-propane sultone or 1,4-butane sultone, the unsaturated sultone may include ethene sultone, 1,3-propene sultone, 1,4-butene sultone, or 1-methyl-1,3-propene sultone, and the non-cyclic sulfone may include divinyl sulfone, dimethyl sulfone, diethyl sulfone, methyl ethyl sulfone, or methyl vinyl sulfone.

Also, a typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator, or a typical porous nonwoven fabric, for example, a nonwoven fabric formed of high melting point glass fibers or polyethylene terephthalate fibers may be used, but the present invention is not limited thereto.

A shape of the lithium secondary battery of the present invention is not particularly limited, but a cylindrical type using a can, a prismatic type, a pouch type, or a coin type may be used.

Hereinafter, the present invention will be described in more detail, according to examples and comparative examples. However, the following examples are merely presented to exemplify the present invention, and the scope of the present invention is not limited thereto.

EXAMPLES

Example 1

(Negative Electrode Preparation)
Step 1: Negative Electrode Material Preparation
A 0.5 μm thick pure graphene sheet (manufactured by BTR New Energy Materials Inc.) separated from graphite and a pitch were mixed in a weight ratio of 1:0.1, and the mixture was put in a sintering furnace, sintered at 950° C. for about 2 hours, and carbonized to form the pitch-containing first coating layer 13 on both sides of the graphene sheet 11.

Next, based on 1 part by weight of the graphene sheet, a copolymer (weight ratio of 0.1) of methyl acrylate and styrene was dissolved in N-methyl-2-pyrrolidone, and the solution was sprayed and coated on the first coating layer 13 formed on both sides of the graphene sheet 11 and heat-treated at 400° C. to prepare a negative electrode material in which the cured second coating layer 15 was formed on the first coating layer 13 formed on both sides of the graphene sheet 11 (see FIG. 1). In this case, a weight ratio of the graphene sheet:the two coating layers in the prepared negative electrode material was 1:0.02.

Step 2: Negative Electrode Preparation
The negative electrode material prepared in step 1, a binder (PVDF), and carbon black, as a conductive agent, were mixed in a ratio of 95:2:3 (wt %) and the mixture was added in a ratio of 100:100 (parts by weight) to NMP, as a solvent, to prepare a negative electrode active material slurry. A 90 μm thick negative electrode collector (copper (Cu) thin film) was coated with the negative electrode active material slurry, dried, and roll-pressed to prepare a negative electrode.

(Positive Electrode Preparation)
90 wt % of lithium cobalt composite oxide ($LiCoO_2$) as positive electrode active material particles, 5 wt % of carbon black as a conductive agent, and 5 wt % of polyvinylidene fluoride (PVDF), as a binder, were added to N-methyl-2-pyrrolidone (NMP), as a solvent, to prepare a positive electrode active material slurry. A 100 μm thick positive electrode collector (Al thin film) was coated with the positive electrode active material slurry, dried, and roll-pressed to prepare a positive electrode.

(Secondary Battery Preparation)
The positive electrode and negative electrode prepared by the above-described method were stacked with a porous polyethylene film to prepare an electrode assembly, the electrode assembly was then put in a battery case, a non-aqueous electrolyte solution was injected, and the battery case was sealed to prepare a lithium secondary battery.

Example 2

A negative electrode, a positive electrode, and a secondary battery including the negative electrode and the positive electrode were prepared in the same manner as in Example 1 except that, in the negative electrode preparation step of Example 1, a polymer coating layer was formed as a first coating layer, and a pitch coating layer was then formed as a second coating layer.

Comparative Example 1

A negative electrode, a positive electrode, and a secondary battery including the negative electrode and the positive electrode were prepared in the same manner as in Example 1 except that artificial graphite without a coating layer was used as the negative electrode material.

Comparative Example 2

A negative electrode, a positive electrode, and a secondary battery including the negative electrode and the positive electrode were prepared in the same manner as in Example 1 except that natural graphite without a coating layer was used as the negative electrode material.

Comparative Example 3

A negative electrode, a positive electrode, and a secondary battery including the negative electrode and the positive electrode were prepared in the same manner as in Example 1 except that a graphene sheet without a coating layer was used as the negative electrode material.

Comparative Example 4

A negative electrode, a positive electrode, and a secondary battery including the negative electrode and the positive electrode were prepared in the same manner as in Example 1 except that graphene having a pitch coating layer formed thereon was used as the negative electrode material.

Comparative Example 5

A negative electrode, a positive electrode, and a secondary battery including the negative electrode and the positive electrode were prepared in the same manner as in Example 1 except that graphene having a polymer coating layer formed thereon was used as the negative electrode material.

Comparative Example 6

Step 1: Negative Electrode Material Preparation

A graphene sheet and a pitch were mixed in a weight ratio of 1:0.7, and the mixture was put in a sintering furnace, sintered at 950° C. for about 2 hours, and carbonized to prepare a graphene sheet including a pitch-containing first coating layer on both sides thereof.

Next, based on 1 part by weight of the graphene sheet, a copolymer (weight ratio of 0.7) of methyl acrylate and styrene was dissolved in N-methyl-2-pyrrolidone, and the solution was sprayed and coated on both sides of the first coating layer and heat-treated at 400° C. to prepare a negative electrode material including the graphene sheet on which a cured second coating layer is formed. In this case, a weight ratio of the graphene sheet:the two coating layers in the prepared negative electrode material was 1:0.1.

A negative electrode, a positive electrode, and a secondary battery including the negative electrode and the positive electrode were prepared in the same manner as in Example 1 except that the above-described negative electrode material was used.

Comparative Example 7

Step 1: Negative Electrode Material Preparation

A graphene sheet and a pitch were mixed in a weight ratio of 1:0.03, and the mixture was put in a sintering furnace, sintered at 950° C. for about 2 hours, and carbonized to prepare a graphene sheet including a pitch-containing first coating layer on both sides thereof.

Next, based on 1 part by weight of the graphene sheet, a copolymer (weight ratio of 0.03) of methyl acrylate and styrene was dissolved in N-methyl-2-pyrrolidone, and the solution was sprayed and coated on both sides of the first coating layer and heat-treated at 400° C. to prepare a negative electrode material including the graphene sheet on which a cured second coating layer is formed. In this case, a weight ratio of the graphene sheet:the two coating layers in the prepared negative electrode material was 1:0.01.

A negative electrode, a positive electrode, and a secondary battery including the negative electrode and the positive electrode were prepared in the same manner as in Example 1 except that the above-described negative electrode material was used.

Experimental Example

Experimental Example 1

Charge and discharge of the lithium secondary batteries prepared in Examples 1 and 2 and Comparative Examples 1 to 7 respectively at 5 C/0.1 C were repeated 50 cycles, and capacity retentions and outputs thus obtained are then presented in Table 1 below.

Also, after the lithium secondary batteries prepared in Examples 1 and 2 and Comparative Examples 1 to 7 were stored at a high temperature of 60° C. for 8 weeks, capacity retentions were measured, and the results thereof are presented in Table 1 below.

TABLE 1

|  | Capacity retention @50 cycle | High-temperature storage @8 weeks, 60° C. storage | Output @5 C/0.1 C |
| --- | --- | --- | --- |
| Example 1 | 96% | 92% | 91% |
| Example 2 | 95.8% | 91.7% | 91% |
| Comparative Example 1 | 79% | 92% | 87% |
| Comparative Example 2 | 84% | 87% | 89.2% |
| Comparative Example 3 | 95.6% | 88% | 91% |
| Comparative Example 4 | 96% | 89.1% | 91% |
| Comparative Example 5 | 94% | 91.1% | 89% |
| Comparative Example 6 | 67% | Not measurable | 79% |
| Comparative Example 7 | 95.7% | 88% | 91% |

As illustrated in Table 1, with respect to the secondary batteries of Examples 1 and 2 using the graphene sheet including two coating layers of the present invention as the negative electrode material, capacity retentions after cycles, high-temperature storage characteristics, and output characteristics were 90% or more, respectively, and it may be understood that these characteristics were improved.

That is, with respect to the secondary batteries of Examples 1 and 2 using the graphene sheet including two coating layers of the present invention as the negative electrode material, it may be understood that the high-temperature storage characteristics, capacity retention, and output characteristics were more improved than the secondary batteries of Comparative Examples of 1 to 3 only including the artificial graphite, natural graphite, or graphene sheet as the negative electrode material. The reason for this is that, since the two coating layers were formed on the surface of the negative electrode material, a safe SEI may be formed on the surface of the negative electrode, and, accordingly, the side reaction with the electrolyte solution was reduced to improve electrochemical performance such as initial efficiency and high-temperature life characteristics.

Also, with respect to the secondary batteries of Examples 1 and 2 using the graphene sheet including two coating layers of the present invention as the negative electrode material, it may be understood that the capacity retentions after 50 cycles, output characteristics, and high-temperature storage characteristics were more improved than the secondary battery of Comparative Example 4 using the negative electrode material including the graphene sheet on which the pitch was only coated and the secondary battery of Comparative Example 5 using the negative electrode material including the graphene sheet on which the polymer was only coated. Furthermore, from the fact that the electrochemical performances of Examples 1 and 2 were improved in comparison to those of Comparative Examples 4 and 5, it may be confirmed that the two coating layers were formed on the negative electrode material of the present invention.

In addition, in a case in which the weight ratio of the graphene sheet:the two coating layers was 1:0.02 as in Examples 1 and 2, the output characteristics and the high-temperature storage characteristics were excellent at 90% or more, but, in a case in which an excessive amount of the coating layer was included because the weight ratio of the graphene sheet:the two coating layers was 1:0.1 as in Comparative Example 6, the resistance was significantly increased to reduce the output characteristics to 79% and the capacity retention may not be measured because the capacity during high-temperature storage was not expressed. Also, in a case in which a trace amount of the coating layer was included because the weight ratio of the graphene sheet:the two coating layers was 1:0.01 as in Comparative Example 7, it may be confirmed that the output characteristics were excellent, but high-temperature storage performance was reduced.

From these results, with respect to the secondary battery including the composite coating graphene sheet prepared in the present invention as the negative electrode material, it may be understood that, since the reaction with the electrolyte solution was suppressed by including an appropriate amount of the two coating layers on both sides of the graphene sheet, initial output characteristics were not only improved, but both of the capacity retention and the high-temperature stability were also improved.

The invention claimed is:

1. A composite negative electrode active material for a secondary battery, the composite negative electrode active material comprising:
    a graphene sheet; and
    two or more coating layers formed on both sides of the graphene sheet,
    wherein the two or more coating layers comprise at least one polymer coating layer and at least one pitch coating layer, and
    the graphene sheet and the two or more coating layers are included in a weight ratio of greater than 1:greater than 0.01 to less than 0.1,
    wherein the polymer coating layer comprises a polyacrylic acid ester-based copolymer,
    wherein the polyacrylic acid ester-based copolymer comprises a copolymer of (A) a (meth)acrylic acid ester-based monomer; and (B) a single material selected from the group consisting of an unsaturated carboxylic acid-based monomer, a vinyl-based monomer, and a nitrile-based monomer, or two or more monomers thereof, and
    wherein the nitrile-based monomer comprises a single material selected from the group consisting of succinonitrile, sebaconitrile, fluoronitrile, and chloronitrile, or a mixture of two or more thereof.

2. The composite negative electrode active material for a secondary battery of claim 1, wherein the (meth)acrylic acid ester-based monomer (A) comprises a single material selected from the group consisting of methyl acrylate, ethyl acrylate, propyl acrylate, isopropyl acrylate, n-butyl acrylate, isobutyl acrylate, n-amyl acrylate, isoamyl acrylate, 2-ethylhexyl methacrylate, 2-ethylhexyl acrylate, 2-hydroxyethyl acrylate, methyl methacrylate, ethyl methacrylate, propyl methacrylate, isopropyl methacrylate, n-butyl methacrylate, isobutyl methacrylate, n-amyl methacrylate, isoamyl methacrylate, n-hexyl methacrylate, 2-hydroxyethyl methacrylate, and hydroxypropyl methacrylate, or a mixture of two or more thereof.

3. The composite negative electrode active material for a secondary battery of claim 1, wherein the unsaturated carboxylic acid-based monomer comprises a single material selected from the group consisting of maleic acid, fumaric acid, methacrylic acid, acrylic acid, glutaconic acid, itaconic acid, tetrahydrophthalic acid, crotonic acid, isocrotonic acid, and nadic acid, or a mixture of two or more thereof.

4. The composite negative electrode active material for a secondary battery of claim 1, wherein the vinyl-based monomer comprises a single material selected from the group consisting of styrene, α-methylstyrene, β-methylstyrene, p-t-butylstyrene, and divinylbenzene, or a mixture of two or more thereof.

5. The composite negative electrode active material for a secondary battery of claim 1, wherein the composite negative electrode active material for a secondary battery comprises:
    the graphene sheet; and
    the two or more coating layers, including a first coating layer formed on both sides of the graphene sheet and a second coating layer formed on a surface of the first coating layer.

6. The composite negative electrode active material for a secondary battery of claim 5, wherein the first coating layer comprises a polymer coating layer, and
    the second coating layer comprises a pitch coating layer.

7. The composite negative electrode active material for a secondary battery of claim 5, wherein the first coating layer comprises a pitch coating layer, and
    the second coating layer comprises a polymer coating layer.

8. The composite negative electrode active material for a secondary battery of claim 1, further comprising at least one additive selected from the group consisting of a conductive agent and a binder.

9. A negative electrode for a secondary battery, the negative electrode comprising:
    a negative electrode collector; and
    a negative electrode active material mixture coated on the negative electrode collector,
    wherein the negative electrode active material mixture comprises the composite negative electrode active material for a secondary battery of claim 1.

10. A lithium secondary battery comprising:
    a positive electrode;
    a negative electrode;
    a separator disposed between the positive electrode and the negative electrode; and
    an electrolyte solution,
    wherein the negative electrode comprises the negative electrode of claim 9.

* * * * *